United States Patent Office 2,959,464
Patented Nov. 8, 1960

2,959,464

NACREOUS LEAD PYROPHOSPHATE PIGMENT AND METHOD OF PRODUCING SAME

Frederick S. Craig, Arlington Heights, Ill., assignor to The Sherwin-Williams Company, Cleveland, Ohio, a corporation of Ohio No Drawing. Filed Aug. 3, 1953, Ser. No. 372,201

3 Claims. (Cl. 23—105)

This invention relates to a novel form of lead pyrophosphate having lamellar crystal form, nacreous luster and resistance to darkening upon exposure for extended periods to ultra violet light.

While lead pyrophosphate is an old compound, no reference has been found as to its existence in lamellar crystal form and nacreous silky luster which may be used as a substitute for guanine.

It has been found in experimental work relative to the manufacture of lead hydrogen phosphate which can be produced in a novel crystal habit characterized by its foliaceous dimension and nacreous luster that these novel characteristics may be retained even though the crystals are heated to a sufficient temperature to drive off as much as one-half molecule of water for each mole of $PbHPO_4$. It has further been found that the lamellar lead pyrophosphate thus obtained is superior in its color retention characteristics to the parent lead acid phosphate when exposed to ultra violet light for extended periods. As the ultimate use of the particular crystal form of these compounds depends upon retention of original brilliance and nacreous luster, and because ultra violet light is one of the elements to which the crystals in the ultimate composition are exposed, it is highy desirable to employ the most stable form of crystal having the requisite characteristics including nacreous luster, brilliance and resistance to discoloration upon exposure to ultra violet light. As crystalline materias of the class described find use in thermopastic molding compositions where elevated temperatures are sometimes required, it is also desirable to employ components having high thermal stability as well.

The field of thermoplastic materials in which the lead pyrophosphate of lamellar crystal form is useful is extremey diverse and includes cellulose nitrate; cellulose acetate; cellulose butyrate; ethyl cellulose; polyethylene; vinyl acetate; acrylic plastics, for example, methyl methacrylate; urea formaldehyde resins; phenolics; etc. In such molding compositions, plastics having included therein lamellar lead pyrophosphate crystals as herein described are adaptable to the production of sheets, films, powders, rods and tubes. However, the use to which lamellar lead pyrophosphate seems particularly adapted is in the field of decorative coatings particularly where novel effects are desired. In such application large wall areas are involved. Guanine, which is extensively used where pearlescent luster is desired, is of prohibitive cost for this use. Mica, which has some merit in such application, must be used in such quantity as not to interfere with the quality of the film. As the quantity of mica is increased in ratio to the total volume of solids in coating compositions, so also is the porosity of the resultant coating increased.

A principal object of this invention is to provide a novel form of lead pyrophosphate characterized by its lamellar crystal form, its nacreous luster and its resistance to discoloration (graying) upon extended exposure to ultra violet light.

It is a further object of this invention to provide a method for the manufacture of lead pyrophosphate in a lamellar crystal form characterized by its scintillating quality when used as a component of an aqueous paint system for protective and decorative coatings.

It is a further object of this invention to provide a lamellar pigmentary particle having a nacreous silky luster which is stable at temperatures up to about 700 degrees C. without deterioration in its pearlescent quality and which will not liberate decomposition products.

Other objects will be apparent from the nature of the novel form of lead pyrophosphate herein described.

Lamellar forms of lead hydrogen phosphate are disclosed by Hunsdiecker, U.S. 2,103,007, who originally produced his novel form of lustrous pigment by precipitating lead acid phosphate in foliaceous form by admixture of a dilute aqueous solution of lead nitrate with aqueous phosphoric acid in the presence of a large quantity of an organic agent selected from the group consisting of alcohol, acetic acid, acetone, diacetone alcohol, isopropyl alcohol and the glycol ethers.

In copending appication of Thornton, U.S. Serial No. 372,180, now Patent 2,703,747 filed of even date herewith, an improved method for the manufacture of a lamellar form of lead acid phosphate is described. In that method a hot dilute aqueous solution of an alkali metal monoacid phosphate salt at a temperature of from 60 degrees to 100 degrees C. is treated with less than a stoichiometric equivalent of an equally hot dilute aqueous solution of lead nitrate acidified to a pH of from 1 to 3 with nitric acid. The crystals are recovered by filtering and washed thoroughly to remove impurities.

Either of the above methods can be employed for producing the original lead acid phosphate essential to the production of the novel lamellar form of lead pyrophosphate herein described. The method of Thornton is preferred, however, as it obviates the necessity of the use of large quantities of organic materials which are normally lost in processing.

The term "nacreous" as used herein does not include the quality of iridescence which is color development from a surface when reflected light is resolved into separated colors which are individually observable. The prior art has indicated that various proposed nacreous substitutes for guanine possess this quality. However, from a rather extensive investigation of prior art compounds of nacreous luster, none examined have been observed to possess an iridescent quality. The terms "pearlescent" and "nacreous" are herein used to describe similar optical properties as are found in prior art quanine substitutes. The terms are used to describe the effect generally obtained from certain foilaceous pigments having a brilliant white luster. This luster is believed due primarily to the high angular sheen of the individual crystals or particles along with their average particle size.

The following examples are illustrative but not limiting.

Example 1

Two stock solutions were prepared as follows:

A first aqueous solution was made by dissolving 165.6 grams lead nitrate per liter of water. The pH of the solution was adjusted to 1.5 from its original 4.2 value. The acidified solution was heated to 85 degrees C. for use.

A second aqueous solution was prepared by dissolving 78.3 grams of disodium monoacid phosphate per liter of water and this solution, too, was heated to 85 degrees C. for use.

To 520 cc. of the second solution in a jacketed vessel was added 500 cc. of the acidified lead nitrate solution while maintaining the temperature within a 70 to 90 degree C. temperature range.

The recovered crystals were further dried at 110 degrees C. to remove all moisture present except that which is a part of the chemical constitution of lead hydrogen phosphate.

One portion of the recovered crystals was thereafter transferred to a porcelain vessel and the gross weight recorded. The remainder of the crystals was held for subsequent tests.

The selected portion crystals were transferred to an oven held at a constant temperature of 210 degrees C. After one hour, the weight of the vessel plus the crystals was determined. It was found that 1/30 of the theoretical weight loss expected in the formation of lead pyrophosphate had occurred. The vessel was again returned to the constant temperature oven and, at the end of 72 hours sufficient weight had been lost to indicate substantially all of the lead acid phosphate had been converted to the pyrophosphate.

Example 2

A second portion of the lamellar lead acid phosphate crystals obtained in the initial phase of Example 1 was weighed out in a suitable ceramic vessel. This sample was transferred to an oven at 310 degrees C. After one hour, the vessel was removed and allowed to return to room temperature in a desiccator. Ninety percent of the total loss in weight expected had occurred in one hour at 310 degrees C. The vessel was again returned to the 310 degree C. oven and re-weighed at the end of twenty-four hours at which time there appeared to be no substantial change in weight. The loss in weight corresponded favorably with that expected in the formation of lead pyrophosphate.

Example 3

A third portion of $PbHPO_4$ crystals obtained in Example 1 was similarly weighed out in a porcelain vessel and transferred to a muffle furnace held at 500 degrees C. After one hour, the vessel was again re-weighed and the loss in weight corresponded to the formation of lead pyrophosphate. The vessel was again returned to the furnace and upon weighing after four hours additional heating was found substantially the same as that recorded at the end of one hour.

Example 4

The temperature of the muffle furnace used in Example 3 was increased to (a) 700 degrees C. and held at that temperature.

Another sample of crystals of lead acid phosphate from Example 1 was weighed out in a ceramic vessel, the weight recorded and the vessel and contents transferred to the muffle furnace. At the end of one hour, the vessel and crystals were re-weighed and the weight loss corresponded to that theoretically expected in the formation of lead pyrophosphate. No sintering of the particles was observed. However, upon increasing the temperature in the muffle furnace to (b) 750 degrees C., some sintering was observed. Upon increasing the temperature to (c) 800 degrees C., fusion of the particles became obvious.

Example 5

A portion of the lead pyrophosphate produced in Example 3 was compounded with an aqueous vehicle containing a styrenebutadiene paint latex and a small amount of casein solution sufficient to prevent emulsion breakdown upon addition of the lead pyrophosphate pigment thereto. The coating was brushed out on a series of Upson board panels. After drying, the paint film was exposed at a distance of about six inches from the spout of a Kipp generator to the fumes of hydrogen sulfide for a period of 10 minutes. No darkening of the film was observable when compared with an untreated panel.

A similar paint was produced using the lamellar lead acid phosphate crystals as described by Hunsdiecker and a series of panels were prepared as above. Panels coated with paints containing the pyrophosphate and the lead acid phosphate were exposed to strong ultra violet light for a period of several days. The lead pyrophosphate containing coating showed less graying and discoloration at the end of the test than did the panels containing lead acid phosphate.

Lead pyrophosphate crystals recovered in Example 4 (a), e.g., 700 degrees C., were examined under the microscope and were found not to vary appreciably in size frequency or color over the original lead acid phosphate crystals before heating. When the lamellar lead acid phosphate crystals are prepared in accordance with Example 1, they are not iso-disperse, or do not have the same crystal size throughout, but the percentage of fines is small and those over a range of from 25 to 60 microns in width and 30 to 120 microns in length were of relatively great frequency. Aqueous paints containing the same gave a brilliant scintillating coating having satisfactory can stability. No decrease in the quality of the film was observed after three months aging test.

From the series of tests it was found that substantial dehydration could be obtained from temperatures of from 200 degrees to 700 degrees C. but that good practice indicated a range of from 275 degrees to 500 degrees C. was to be preferred.

Having thus described my invention, what I claim is:

1. A process for producing pigmentary lead pyrophosphate in lamellar crystal form characterized by its nacreous luster and resistance to discoloration upon extended exposure to ultra violet light which comprises treating a hot dilute aqueous solution of an alkali metal monoacid phosphate salt at a temperature of from 60 degrees to 100 degrees C. with less than a stoichiometric equivalent of a dilute aqueous solution of lead nitrate acidified to a pH of from 1 to 3 with nitric acid, recovering and washing the precipitated crystals having a particle size range of from 25 to 60 microns in width and 30 to 120 microns in length and particle thickness relative to the length and width thereof in minor dimension and heating said crystals at a temperature of from about 225 degrees to 700 degrees C. for a time sufficient to bring said crystals to a substantially constant weight.

2. A method of manufacture of an inorganic substitute for guanine pigment which comprises heating lead acid phosphate crystals of lamella crystal habit having a particle size range of from 25 to 60 microns in width and 30 to 120 microns in length and particle thickness relative to length and width thereof of minor dimension to a temperature of from about 225° to 700° C. for a time sufficient to convert said crystals over to the pyrophosphate of the same crystal habit and particle size range, said lamellar pyrophosphate crystals characterized by their improved resistance to discoloration upon extended exposure to ultra-violet light as compared with the acid phosphate crystals.

3. An inorganic substitute for guanine pigment which comprises lead pyrophosphate crystals characterized by their lamellar crystal form, nacreous lustre, resistance to discoloration upon extended exposure to ultra-violet light, a particle size range of from 25 to 60 microns in width and 30 to 120 microns in length and particle thickness relative to length and width thereof of minor dimension produced by heating lead acid phosphate of lamellar crystal habit of the same particle size range to a temperature of from about 225° to 700° C. for a time sufficient to convert said acid phosphate crystals to the pyrophosphate.

References Cited in the file of this patent

UNITED STATES PATENTS

| | | |
|---|---|---|
| 2,103,007 | Hunsdiecker | Dec. 21, 1937 |
| 2,703,747 | Thornton | Mar. 8, 1955 |

OTHER REFERENCES

Mellor: Comprehensive Treatise on Inorganic and Theoretical Chemistry, vol. 7, page 880, 1927, Longmans, Green and Co., N.Y.